UNITED STATES PATENT OFFICE 2,312,321

REACTION PRODUCT OF ALDEHYDES AND GUANAZO TRIAZINES

Gaetano F. D'Alelio and James W. Underwood, Pittsfield, Mass., assignors to General Electric Company, a corporation of New York No Drawing. Application September 30, 1941, Serial No. 413,006

18 Claims. (Cl. 260—42)

This invention relates to the production of new synthetic materials and more particularly to new reaction products of particular utility in the plastics and coating arts. Specifically the invention is concerned with compositions of matter comprising a condensation product of ingredients comprising an aldehyde, including polymeric aldehydes and aldehyde-addition products, e. g., formaldehyde, paraformaldehyde, dimethylol urea, trimethylol melamine, etc., and a triazine derivative corresponding to the following general formula:

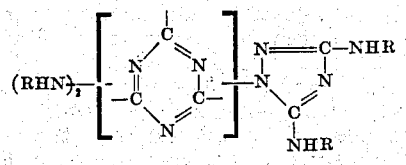

In the above formula R represents a member of the class consisting of hydrogen and monovalent hydrocarbon and halohydrocarbon radicals, numerous illustrative examples of which are: aliphatic (e. g., methyl, ethyl, propyl, isopropyl, allyl, butyl, secondary butyl, isobutyl, butenyl, amyl, isoamyl, hexyl, etc.), including cycloaliphatic (e. g., cyclopentyl, cyclopentenyl, cyclohexyl, cyclohexenyl cycloheptyl, etc.); aryl (e. g., phenyl, diphenyl or xenyl, naphthyl, etc.); aliphatic-substituted aryl (e. g., tolyl, xylyl, ethylphenyl, propylphenyl, allylphenyl, isopropylphenyl, 2-butenylphenyl, tertiary-butylphenyl, etc.); aryl-substituted aliphatic (e. g., benzyl, phenylethyl, phenylpropyl, cinnamyl, phenylisopropyl, etc.); and their homologues, as well as those groups with one or more of their hydrogen atoms substituted by, for example, a halogen. Specific examples of halogeno-substituted hydrocarbon radicals are chlorphenyl, chlorcyclohexyl, chlorethyl, dichlorphenyl, ethylchlorphenyl, phenylchlorethyl, brompropyl, bromtolyl, etc. Preferably R in the above formula is hydrogen. Also especially suitable for use in carrying the present invention into effect are triazine derivatives corresponding to the general formula:

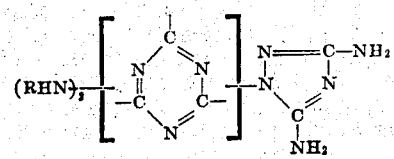

where R is a member of the class consisting of hydrogen and monovalent hydrocarbon and halohydrocarbon radicals.

Instead of the guanazo symmetrical triazines (s-triazines) represented by the above formulas, corresponding derivatives of the asymmetrical triazines or of the vicinal triazines may be used. Also, instead of the guanazo diamino [(NHR)₂] triazines represented by the above formulas, the di- and tri-guanazo triazines (symmetrical, asymmetrical or vicinal) may be employed.

The triazine derivatives that are used in carrying the present invention into effect are more fully described and are specifically claimed in our copending application Serial No. 413,007, filed concurrently herewith, now Patent No. 2,295,567, issued September 15, 1942, and assigned to the same assignee as the present invention. As pointed out in this copending application, the mono-guanazo triazines can be prepared by effecting reaction between a mono-hydrazino diamino [(—NHR)₂] triazine and dicyandiamide (cyanoguanidine). This reaction advantageously may be carried out in an aqueous medium and preferably in the presence of one mol of inorganic acid (e. g., hydrochloric, hydrobromic, sulfuric, etc.) for each mol of hydrazino triazine. The acid may be present in the form of an inorganic acid mono salt of the hydrazino triazine. If desired, biguanide (guanyl-guanidine) may be used in place of dicyandiamide. In such event it is preferable either to use two mols of inorganic acid for each mol of hydrazino diamino triazine or to use the inorganic acid monosalt of both the biguanide and the hydrazino triazine, since two mols of ammonia will be liberated. For the preparation of guanazo triazines in which the substituent groups attached to the carbon atoms of the guanazo radical are —NHR groups, several methods may be used. One suitable method involves the reaction of substituted cyanoguanidines (e. g., N-phenyl N'-cyano guanidine) or substituted guanylguanidines (e. g., N-phenyl N'-guanyl guanidine) with the hydrazino triazine. Another method involves the amminolysis of the —NH₂ groups attached to the carbon atoms of the guanazo radical with a primary amine (e. g., aniline, methyl amine) so that the —NH₂ groups are replaced by —NHR groups, where R is a hydrocarbon radical corresponding to the hydrocarbon radical of the primary amine.

Specific examples of guanazo triazines that may be used in producing our new condensation products are listed below:

2-guanazo 4,6-diamino 1,3,5-triazine (4-guanazo 2,6-diamino 1,3,5-triazine; 6-guanazo 2,4-diamino 1,3,5-triazine)
2-guanazo 4,6-di-(methylamino) 1,3,5-triazine
2-guanazo 4,6-di-(ethylamino) 1,3,5-triazine
2-guanazo 4-methylamino 6-amino 1,3,5-triazine
2-guanazo 4-anilino 6-propylamino 1,3,5-triazine
2-guanazo 4,6-di-(anilino) 1,3,5-triazine
2-guanazo 4-cyclohexylamino 6-toluido 1,3,5-triazine
2-guanazo 4,6-di-(chloranilino) 1,3,5-triazine
2-guanazo 4-pentylamino 6-butylamino 1,3,5-triazine
2-guanazo 4-naphthylamino 6-benzylamino 1,3,5-triazine
2-guanazo 4,6-di-(chlorbutylamino) 1,3,5-triazine
2-guanazo 4,6-di-(propylamino) 1,3,5-triazine
2-guanazo 4,6-di-(isopropylamino) 1,3,5-triazine
2-guanazo 4,6-di-(butylamino) 1,3,5-triazine
2-guanazo 4,6-di-(isobutylamino) 1,3,5-triazine
2-guanazo 4,6-di-(phenylamino) 1,3,5-triazine
2-guanazo 4,6-di-(cyclohexylamino) 1,3,5-triazine
2-guanazo 4,6-di-(chlorphenylamino) 1,3,5-triazine
2-guanazo 4-ethylamino 6-amino 1,3,5-triazine
2-guanazo 4-phenylamino 6-amino 1,3,5-triazine
2-guanazo 4-cyclohexylamino 6-amino 1,3,5-triazine The formulas for many of the above compounds are shown in our above-identified copending application Serial No. 413,007.

The present invention is based on our discovery that new and valuable materials of particular utility in the plastics and coating arts can be produced by effecting reaction between ingredients comprising essentially an aldehyde, including polymeric aldehydes and aldehyde-addition products, and triazines (more particularly, the 1,3,5-triazines) containing a guanazo radical,

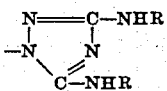

attached directly to a carbon atom of the triazine nucleus.

Resins heretofore have been made by condensing an aldehyde with certain aminotriazines, e. g., melamine. Such known resins have excellent heat and water resistance, but are deficient in other properties that are desirable in a resin to be used in the production of molding compounds and molded articles. The urea-aldehyde and the substituted urea-aldehyde resins (e. fi., dicyandiamide-aldehyde and guanylguanidine-aldehyde condensation products), on the other hand, have much better flow characteristics than the conventional aminotriazine-aldehyde, specifically melamine-formaldehyde resins, but are less resistant to water. The resinous condensation products of the present invention have a high water resistance approximating that of the known aminotriazine-aldehyde resins plus the improved flow characteristics of the resinous condensation products of an aldehyde with urea, thiourea or iminourea or substituted ureas, thioureas or iminoureas. The heat resistance of our new resins also is much better than that of the urea-aldehyde or substituted urea-aldehyde resins.

Thus it is seen that the present invention provides a resinous composition which has combined therein the desirable properties of the conventional aminotriazine-aldehyde and urea- and substituted urea-aldehyde resins without sacrifice of other useful properties. This is a surprising and unexpected result that in no way could have been predicted. Because of the unique properties of the resins of this invention, they are suitable for molding and other applications for which the ordinary aminotriazine-aldehyde and urea- and substituted urea-aldehyde resins are unsuited.

In practicing our invention the initial condensation reaction may be carried out at normal or at elevated temperatures, at atmospheric, subatmospheric or super-atmospheric pressures and under neutral, alkaline or acid conditions. Preferably the reaction between the components is initiated under alkaline conditions.

Any substance yielding an alkaline or an acid aqueous solution may be used in obtaining alkaline or acid conditions for the initial condensation reaction. For example, we may use an alkaline substance such as sodium, potassium or calcium hydroxides, sodium or potassium carbonates, mono-, di- or tri-amines, etc. In some cases it is desirable to cause the initial condensation reaction between the components to take place in the presence of a primary condensation catalyst and a secondary condensation catalyst. The primary catalyst advantageously is either an aldehyde-non-reactable nitrogen-containing basic tertiary compound, e. g., tertiary amines such as trialkyl (e. g., trimethyl, triethyl, etc.) amines, triaryl (e. g., triphenyl, tricresyl, etc.) amines, etc., or an aldehyde-reactable nitrogen-containing basic compound, for instance ammonia, primary amines (e. g., ethyl amine, propyl amine, etc.) and secondary amines (e. g., dipropyl amine, dibutyl amine, etc.). The secondary condensation catalyst, which ordinarily is used in an amount less than the amount of the primary catalyst, advantageously is a fixed alkali, for instance a carbonate, cyanide or hydroxide of an alkali metal (e. g., sodium, potassium, lithium, etc.).

Illustrative examples of acid condensation catalysts that may be employed are inorganic or organic acids such as hydrochloric, sulfuric, phosphoric, acetic, lactic, acrylic, malonic, etc., or acid salts such as sodium acid sulfate, monosodium phosphate, monosodium phthalate, etc. Mixtures of acids, of acid salts or of acids and of acid salts may be employed if desired.

The reaction between the aldehyde, e. g., formaldehyde, and the guanazo triazine, e. g., 2-guanazo 4,6-diamino 1,3,5-triazine, may be carried out in the presence of solvents or diluents, fillers, other natural or synthetic resinous bodies, or while admixed with other materials that also can react with the aldehydic reactant or with the triazine derivative, e. g., ketones, urea, thiourea, selenourea, iminourea (guanidine), substituted ureas, thioureas, selenoureas and iminoureas, numerous examples of which are given in various copending applications of one of us (Gaetano F. D'Alelio), for instance in D'Alelio copending application Serial No. 363,037, filed October 26, 1940; monoamides of monocarboxylic and polycarboxylic acids and polyamides of polycarboxylic acids, e. g., acetamide, halogenated acetamides (e. g., a chlorinated acetamide), maleic monoamide, malonic monoamide, phthalic monoamide, maleic diamide, fumaric diamide, malonic diamide, itaconic diamide, succinic diamide, phthalic diamide, the monoamide, diamide and triamide of tricarballylic acid, etc.; aldehyde-reactable triazines other than the guanazo triazines constituting the primary components of the resins of the present invention, e. g., melamine, ammeline, ammelide, numerous other examples being given in various D'Alelio copending applications, for instance in application Serial No. 377,524, filed February 5, 1941, and in applications referred to in said copending application; phenol and substituted phenols, e. g., the cresols, the xylenols, the tertiary alkyl phenols and other phenols such as mentioned in D'Alelio Patent 2,239,441; monohydric and polyhydric alcohols, e. g., butyl alcohol, amyl alcohol, ethylene glycol, glycerine, polyvinyl alcohol, etc.; amines, including aromatic amines, e. g., aniline, etc.; and the like. These modifying reactants may be incorporated with the guanazo triazine and the aldehyde by mixing all the reactants and effecting condensation therebetween or by various permutations of reactants as described, for example, in D'Alelio copending application Serial No. 363,037 with particular reference to reactions involving a urea, an aldehyde and a semi-amide of oxalic acid. For instance, we may form a partial condensation product of ingredients comprising urea or melamine, a guanazo triazine of the kind herein described (for example, 2-guanazo 4,6-diamino 1,3,5-triazine, etc.) and an aldehyde, including polymeric aldehydes and aldehyde-addition products, for instance formaldehyde, paraformaldehyde, dimethylol urea, trimethylol melamine, etc., and thereafter effect reaction between this partial condensation product and, for example, a curing reactant, specifically a chlorinated acetamide, to obtain a heat-curable composition.

Some of the condensation products of this invention are thermoplastic materials even at an advanced stage of condensation, while others are thermosetting or potentially thermosetting bodies that convert under heat or under heat and pressure to an insoluble, infusible state. The thermoplastic condensation products are of particular value as plasticizers for other synthetic resins. The thermosetting or potentially thermosetting condensation products, alone or mixed with fillers, pigments, dyes, lubricants, plasticizers, etc., may be used, for example, in the production of molding compositions.

The heat-curable resinous condensation products of this invention show excellent flow characteristics during a short curing cycle. This is a property that is particularly desirable in a molding compound. The molded articles have a good surface finish and excellent resistance to water and arcing. They have a high dielectric strength.

Depending upon the particular reactants employed and the particular conditions of reaction, the intermediate or partial condensation products vary from clear, colorless or colored, syrupy, water-soluble liquids to viscous, milky dispersions and gel-like masses of decreased solubility in ordinary solvents such as glycol, glycerine, water, etc. These liquid intermediate condensation products may be concentrated or diluted further by the removal or addition of volatile solvents to form liquid coating compositions of adjusted viscosity and concentrations. The heat-convertible or potentially heat-convertible resinous condensation products may be used in liquid state, for instance as surface-coating materials, in the production of paints, varnishes, lacquers, enamels, etc., for general adhesive applications, is producing laminated articles and for numerous other purposes. The liquid heat-hardenable or potentially heat-hardenable condensation products also may be used directly as casting resins, while those which are of a gel-like nature in partially condensed state may be dried and granulated to form clear, unfilled heat-convertible resins.

In order that those skilled in the art better may understand how this invention may be carried into effect, the following examples are given by way of illustration. All parts are by weight.

*Example 1*

| | Parts |
|---|---|
| 2-guanazo 4,6-diamino 1,3,5-triazine | 62.4 |
| Aqueous formaldehyde (approx. 37.1% HCHO) | 97.2 |
| Aqueous ammonia (approx. 28% NH$_3$) | 6.2 |
| Sodium hydroxide in 5 parts water | 0.1 | were heated together under reflux at the boiling temperature of the mass for 15 minutes to yield a syrupy condensation product having a pH of 7.86. A molding composition was made from the syrup by mixing therewith 24 parts alpha cellulose in flock form and 0.2 part of a mold lubricant, specifically zinc stearate. The wet molding compound was dried at 65° C. until sufficient moisture had been removed to provide a molding composition that could be molded satisfactorily. A sample of the dried molding compound was molded for 3 minutes at 135° C. under a pressure of 2,000 pounds per square inch. The cured, molded piece thereby obtained showed excellent flow characteristics during molding.

*Example 2*

| | Parts |
|---|---|
| 2-guanazo 4,6-diamino 1,3,5-triazine | 12.5 |
| Urea | 14.4 |
| Aqueous formaldehyde (approx. 37.1% HCHO) | 97.2 |
| Aqueous ammonia (approx. 28% NH$_3$) | 2.7 |
| Sodium hydroxide in 3.5 parts water | 0.07 |
| Chloracetamide (monochloracetamide) | 0.6 |

All of the above components with the exception of the chloracetamide were heated together under reflux at boiling temperature for 20 minutes. The chloracetamide was now added and refluxing was continued for an additional 8 minutes to cause the chloracetamide to intercondense with the urea-guanazo triazine-formaldehyde partial condensation product. The resulting syrupy condensation product had a pH of 5.2. When a small sample of this syrup was heated on a 140° C. hotplate it cured to an insoluble, infusible state. A molding composition was made from the syrupy condensation product by mixing it with 40 parts alpha cellulose and 0.2 part zinc stearate. The wet compound was dried at 65° C. to obtain a molding compound that could be molded satisfactorily. A sample of the dried compound, molded as described under Example 1, yielded a molded piece that was well cured throughout, had a well-knitted structure and showed good flow characteristics during molding. The molded article had a good surface appearance and excellent resistance to moisture.

Instead of using chloracetamide as above described in accelerating the curing of the potentially reactive resinous material, heat-convertible compositions may be produced by adding to the syrup direct or active curing catalysts (e. g., citric acid, phthalic anhydride, malonic acid, oxalic acid, etc.), or latent curing catalysts (e. g., sodium chloracetate, N-diethyl chloracetamide, glycine ethyl ester hydrochloride, etc.) or by intercondensation with curing reactants other than monochloracetamide (e. g., di- and tri-chloracetamides, chloracetonitriles, alpha, beta-dibrompropionitrile, aminoacetamide hydrochloride, aminoacetonitrile hydrochloride, ethylene diamine monohydrochloride, diethanolamine hydrochloride, nitrourea, chloracetyl urea, chloracetone, glycine, sulfamic acid, citric diamide, phenacyl chloride, etc.). Other examples of active and latent curing catalysts and of curing reactants that may be employed to accelerate or to effect the curing of the thermosetting or potentially thermosetting resins of this and other examples are given in various D'Alelio copending applications, for instance in copending applications Serial No. 346,962, filed July 23, 1940, and Serial No. 354,395, filed August 27, 1940, both of which applications are assigned to the same assignee as the present invention.

*Example 3*

|   | Parts |
|---|---|
| 2-guanazo 4,6-diamino 1,3,5-triazine | 31.2 |
| Sulfanilamide | 32.3 |
| Aqueous formaldehyde (approx. 37.1% HCHO) | 97.2 |
| Aqueous ammonia (approx. 28% NH₃) | 6.3 |
| Sodium hydroxide in 3 parts water | 0.06 | were heated together under reflux at the boiling temperature of the mass for 7 minutes, at the end of which period of time the syrup suddenly gelled. When a sample of the gelled mass was heated on a 140° C. hotplate it cured to an insoluble, infusible state in the absence of a curing agent. A sample of the dried gel was molded at 135° C. for 3 minutes under a pressure of 2,000 pounds per square inch. A transparent, well-knitted, molded piece was obtained.

*Example 4*

|   | Parts |
|---|---|
| 2-guanazo 4,6-diamino 1,3,5-triazine | 31.2 |
| Dimethylol urea (commercial grade containing approx. 11% by weight of water) | 80.6 |
| Aqueous ammonia (approx. 28% NH₃) | 3.1 |
| Sodium hydroxide in 2.5 parts water | 0.05 |
| Water | 160.0 |
| Chloracetamide | 0.4 |

All of the above components with the exception of the chloracetamide were heated together under reflux at boiling temperature for 9 minutes. The chloracetamide was now added and refluxing was continued for an additional one minute. The resulting syrupy condensation product had a pH of 6.92. A molding compound was made by mixing with this syrup 38 parts alpha cellulose and 0.2 part zinc stearate. The wet compound was dried at 65° C. until sufficient moisture had been removed to provide a molding compound that could be molded satisfactorily. A well-cured molded piece having excellent water resistance was obtained by molding a sample of the dried compound as described under Example 1. The molding composition showed excellent plastic flow during molding. The dimethylol urea in the above formula may be replaced in whole or in part by a methylol melamine in equivalent amount, e. g., trimethylol melamine, hexamethylol melamine, etc.

*Example 5*

|   | Parts |
|---|---|
| 2-guanazo 4,6-diamino 1,3,5-triazine | 31.2 |
| Acrolein | 33.6 |
| Aqueous ammonia (approx. 28% NH₃) | 6.0 |
| Sodium hydroxide in 3 parts water | 0.06 |
| Water | 20.0 | were heated together under reflux at boiling temperature for 15 minutes. At the end of this period of time a resinous condensation product had precipitated from the solution in the form of a sticky, yellow mass. When a sample of this resinous material was heated on a 140° C. hotplate it cured to an insoluble, infusible state in the absence of a curing agent.

*Example 6*

|   | Parts |
|---|---|
| 2-guanazo 4,6-diamino 1,3,5-triazine | 31.2 |
| Butyl alcohol | 55.0 |
| Aqueous formaldehyde (approx. 37.1% HCHO) | 48.6 |
| Sodium hydroxide in 4.5 parts water | 0.09 | were heated together under reflux at boiling temperature for 15 minutes. When a sample of this syrup was heated on a 140° C. hotplate, it bodied to a soft, thermoplastic resin. The addition of chloracetamide, sulfamic acid, citric acid, glycine, phthalic anhydride and other curing agents such as described under Example 2, either to the syrupy or dehydrated reaction product, yielded a resinous material that was convertible at temperatures of the order of 140° C. to a heat-hardened, infusible state. The dehydrated, fusible resin was soluble in ethylene glycol monoethyl ether and diethylene glycol monoethyl ether but was insoluble in water, alcohol, benzene and a mixture of 80% acetone, 10% toluene and 10% isopropyl alcohol. The solubility and film-forming characteristics of the alcohol-modified guanazo triazine-formaldehyde condensation product of this example make it especially suitable for use in the production of spirit and baking varnishes. For example, it may be used to advantage as a modifier of varnishes of the aminoplast and alkyd-resin types.

*Example 7*

|   | Parts |
|---|---|
| 2-guanazo 4,6-diamino 1,3,5-triazine | 31.2 |
| Acetamide | 8.8 |
| Aqueous formaldehyde (approx. 37.1% HCHO) | 72.9 |
| Sodium hydroxide in 3 parts water | 0.06 | were heated together under reflux at boiling temperature for 15 minutes. The resulting reaction product gelled upon standing at room temperature. When a sample of this gelled mass was heated on a 140° C. hotplate it bodied to a thermoplastic, transparent resin. Chloracetamide and other curing agents such as mentioned under Example 2, when incorporated either into the gelled mass or into the dehydrated thermoplastic resin, yielded a thermosetting resin that was converted into an infusible state when heated at 140° C. The dehydrated, fusible resin is difficultly soluble in alcohol, Solvatone and benzene.

*Example 8*

|   | Parts |
|---|---|
| 2-guanazo 4,6-diamino 1,3,5-triazine | 31.2 |
| Diethyl malonate | 24.0 |
| Aqueous formaldehyde (approx. 37.1% HCHO) | 72.9 |
| Sodium hydroxide in 3.5 parts water | 0.07 | were heated together under reflux at boiling temperature for 15 minutes. The resulting resinous syrup was a potentially heat-convertible material, as evidenced by the fact that when a sample of it was mixed with a small amount of sulfamic acid and the resulting mixture then heated on a 140° C. hotplate, it cured to an insoluble, infusible state.

Example 9

| | Parts |
|---|---|
| 2-guanazo 4,6-diamino 1,3,5-triazine | 31.2 |
| Glycerine | 13.8 |
| Aqueous formaldehyde (approx. 37.1% HCHO) | 72.9 |
| Sodium hydroxide in 3 parts water | 0.06 | were heated together under reflux at boiling temperature for 9 minutes. An insoluble and infusible resinous mass was produced when a sample of the resulting syrup was treated with chloracetamide, followed by heating at a temperature of the order of 140° C. The dehydrated, fusible resin showed approximately the same solubility characteristics as the dehydrated fusible resin of Example 6. Instead of chloracetamide, other curing agents such as mentioned under Example 2 may be incorporated into the syrupy or dehydrated condensation product to provide a heat-convertible material which, under heat, cures to an insoluble and infusible state.

Example 10

| | Parts |
|---|---|
| 2-guanazo 4,6-diamino 1,3,5-triazine | 31.2 |
| Polyvinyl alcohol | 39.6 |
| Aqueous formaldehyde (approx. 37.1% HCHO) | 72.9 |
| Sodium hydroxide in 3.5 parts water | 0.07 |
| Water | 20.0 | were heated together under reflux at boiling temperature for 14 minutes. When a sample of the resulting syrup was heated on a 140° C. hotplate, it bodied to a thermoplastic mass. The addition of a small amount of dilute hydrochloric acid to the syrupy condensation product, followed by heating on a 140° C. hotplate, caused the dehydrated syrup to cure rapidly to an infusible state. The product of this example is especially suitable for use in the production of varnishes and as modifiers of other synthetic resinous materials. Instead of hydrochloric acid, sulfamic acid or other curing agents may be incorporated into the syrupy condensation product or into the dehydrated syrup to accelerate or to effect the conversion of the initial reaction product to an insoluble, an infusible or an insoluble and infusible state.

It will be understood, of course, by those skilled in the art that our invention is not limited to the use of the specific guanazo triazine mentioned in the above illustrative examples and that any other guanazo triazine may be employed in the production of the new condensation products of this invention, for example guanazo 1,3,5-triazines such as hereinbefore specifically mentioned by way of illustration, including 2-guanazo 4,6-di-(methylamino) 1,3,5-triazine, 2-guanazo 4,6-di-(ethylamino) 1,3,5-triazine, etc.

In producing these new condensation products the choice of the aldehyde is dependent largely upon economic considerations and upon the particular properties desired in the finished product. We prefer to use as the aldehydic reactant formaldehyde or compounds engendering formaldehyde, e. g., paraformaldehyde, hexamethylene tetramine, etc. Illustrative examples of other aldehydes that may be used are acetaldehyde, propionaldehyde, butyraldehyde, methacrolein, crotonaldehyde, benzaldehyde, furfural, etc., mixtures thereof, or mixtures of formaldehyde (or compounds engendering formaldehyde) with such aldehydes. Illustrative examples of aldehyde-addition products that may be employed instead of the aldehydes themselves are the mono- and poly-(N-carbinol) derivatives, more particularly the mono- and poly-methylol derivatives, of urea, thiourea, selenourea and iminourea, and of substituted ureas, thioureas, selenoureas and iminoureas (numerous examples of which are given in D'Alelio copending application Serial No. 377,524), mono- and poly-(N-carbinol) derivatives of amides of polycarboxylic acids, e. g., maleic, itaconic, fumaric, adipic, malonic, succinic, citric, phthalic, etc., mono- and poly-(N-carbinol) derivatives of amidogentriazines, numerous examples of which are given in D'Alelio copending application Serial No. 377,524, etc. Particularly good results are obtained with active methylene-containing bodies such as mono- and di-methylol ureas and the methylol melamines, e. g., mono-, di-, tri-, tetra-, penta- and hexamethylol melamines. Mixtures of aldehydes and aldehyde-addition products may be employed, e. g., mixtures of formaldehyde and methylol compounds such, for instance, as dimethylol urea and trimethylol melamine.

The ratio of the aldehydic reactant to the triazine derivative may be varied over a wide range, but the aldehydic component ordinarily is employed in an amount corresponding to at least one mol of the aldehyde, specifically formaldehyde, for each mol of the triazine derivative. Thus we may use, for example, from one to seven or eight or more mols of an aldehyde for each mol of triazine derivative. When the aldehyde is available for reaction in the form of an alkylol derivative, more particularly a methylol derivative such, for instance, as dimethylol urea, trimethylol melamine, etc., then higher amounts of such aldehyde-addition products ordinarily are used, for example, up to 16 or 18 or more mols of such alkylol derivatives for each mol of the triazine derivative.

As indicated hereinbefore, and as further shown by a number of the examples, the properties of the fundamental resins of this invention may be varied widely by introducing other modifying bodies before, during or after effecting condensation between the primary components. Thus, as modifying agents we may use, for instance, monohydric alcohols such as ethyl, propyl, isopropyl, isobutyl, hexyl, etc., alcohols; polyhydric alcohols such as diethylene glycol, triethylene glycol, pentaerythritol, etc.; amides such as formamide, stearamide, acrylamide, benzamide, toluene sulfonamides, benzene disulfonamides, benzene trisulfonamides, adipic diamide, phthalamide, etc.; amines such as ethylene diamine, phenylene diamine, etc.; phenol and substituted phenols, including aminophenols, etc.; ketones, including halogenated ketones; nitriles, including halogenated nitriles, e. g., acrylonitrile, methacrylonitrile, succinonitrile, chloracetonitriles, etc.; acylated ureas, more particularly halogenated acylated ureas of the kind described, for example, in D'Alelio copending applications Serial No. 289,273, filed August 9, 1939, now Patent No. 2,281,559, and Serial No. 400,649, filed July 1, 1941, now Patent No. 2,294,873; and others.

The modifying bodies also may take the form of high molecular weight bodies with or without resinous characteristics, for example, hydrolyzed wood products, formalized cellulose derivatives, lignin, protein-aldehyde condensation products, resins obtained by reaction of an aldehyde with the aminodiazines (e. g., 2,4,6-triaminopyrimidine, 2,4-diaminoquinazoline, etc.), with the aminodiazoles, alone or admixed with, for example, urea, melamine or urea and melamine. Other examples of modifying bodies are the urea-aldehyde condensation products, the aniline-aldehyde condensation products, furfural condensation products, phenol-aldehyde condensation products, modified or unmodified, saturated or unsaturated polyhydric alcohol-polycarboxylic acid condensation products, water-soluble cellulose derivatives, natural gums and resins such as shellac, rosin, etc.; polyvinyl compounds such as polyvinyl esters, e. g., polyvinyl acetate, polyvinyl butyrate, etc., polyvinyl ethers, including polyvinyl acetals, specifically polyvinyl formal, etc.

Instead of effecting reaction between a guanazo triazine of the kind herein described and an aldehyde, e. g., formaldehyde, we may cause an aldehyde to condense with a salt (organic or inorganic) of the triazine derivative or with a mixture of the triazine derivative and a salt thereof. Examples of organic and inorganic acids that may be used in the preparation of such salts are hydrochloric, sulfuric, phosphoric, boric, acetic, chloracetic, propionic, butyric, valeric, acrylic, polyacrylic, methacrylic, polymethacrylic, oxalic, malonic, succinic, adipic, malic, maleic, fumaric, benzoic, salicylic, camphoric, phthalic, etc.

Dyes, pigments, plasticizers, mold lubricants, opacifiers and various fillers (e. g., wood flour, glass fibers, asbestos, including defibrated asbestos, mineral wool, mica, cloth cuttings, etc.) may be compounded with the resin in accordance with conventional practice to provide various thermoplastic and thermosetting molding compositions.

The thermosetting molding compositions of this invention are usually molded at temperatures of the order of 100° to 200° C. and at pressures of the order of 1,000 to 5,000 pounds or more per square inch.

The modified and unmodified resinous compositions of this invention have a wide variety of uses. For example, in addition to their use in the production of molding compositions, they may be used as modifiers of other natural and synthetic resins, as laminating varnishes in the production of laminated articles wherein sheet materials, e. g., paper, cloth, sheet asbestos, etc., are coated and impregnated with the resin, superimposed and thereafter united under heat and pressure. They may be used in the production of wire or baking enamels from which insulated wires and other coated products are made, for bonding or cementing together mica flakes to form a laminated mica article, for bonding together abrasive grains in the production of resin-bonded abrasive articles such, for instance, as grindstones, sandpapers, etc., in the manufacture of electrical resistors, etc. They also may be employed for treating cotton, linen and other cellulosic materials in sheet or other form. They also may be used as impregnants for electrical coils and for other electrically insulating applications.

What we claim as new and desire to secure by Letters Patent of the United States is:

1. A composition of matter comprising the reaction product of ingredients comprising an aldehyde and a compound corresponding to the general formula

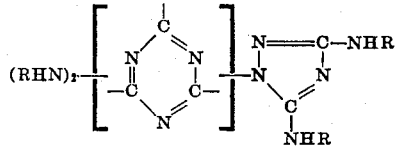

where R represents a member of the class consisting of hydrogen and monovalent hydrocarbon and halo-hydrocarbon radicles.

2. A composition as in claim 1 wherein the aldehyde is formaldehyde.

3. A composition as in claim 1 wherein the reaction product is an alkaline-catalyzed reaction product of the stated components.

4. A composition as in claim 1 wherein the reaction product is an alcohol-modified reaction product of the stated components.

5. A heat-curable resinous composition comprising the heat-convertible reaction product of ingredients comprising formaldehyde and a compound corresponding to the general formula

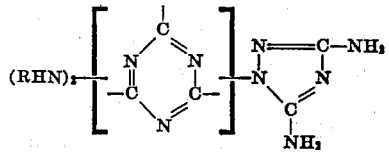

where R is a member of the class consisting of hydrogen and monovalent hydrocarbon and halo-hydrocarbon radicals.

6. A product comprising the heat-cured resinous composition of claim 5.

7. A resinous composition comprising the product of reaction of ingredients comprising 2-guanazo 4,6-diamino 1,3,5-triazine and an aldehyde.

8. A resinous composition comprising the product of reaction of ingredients comprising 2-guanazo 4,6-diamino 1,3,5-triazine and formaldehyde.

9. A composition comprising the product of reaction of ingredients comprising a urea, an aldehyde and a compound corresponding to the general formula

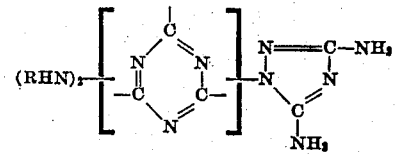

where R is a member of the class consisting of hydrogen and monovalent hydrocarbon and halo-hydrocarbon radicals.

10. A heat-curable resinous composition comprising the heat-convertible reaction product of (1) a partial condensation product of ingredients comprising formaldehyde and a compound corresponding to the general formula

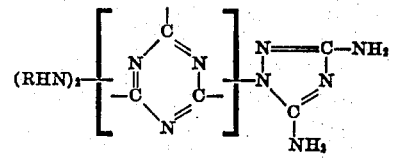

where R represents a member of the class consisting of hydrogen and monovalent hydrocarbon and halo-hydrocarbon radicals, and (2) a curing reactant.

11. A resinous composition as in claim 10 wherein the curing reactant is a chlorinated acetamide.

12. A product comprising the heat-cured composition of claim 10.

13. A resinous composition comprising the product of reaction of (1) a partial condensation product of ingredients comprising urea, 2-guanazo 4,6-diamino 1,3,5-triazine and formaldehyde and (2) chloracetamide.

14. A resinous composition comprising the product of reaction of (1) a partial condensation product of ingredients comprising melamine, 2-guanazo 4,6-diamino 1,3,5-triazine and formaldehyde and (2) chloracetamide.

15. A resinous product of reaction of ingredients comprising dimethylol urea and 2-guanazo 4,6-diamino 1,3,5-triazine.

16. A resinous product of reaction of ingredients comprising trimethylol melamine and 2-guanazo 4,6-diamino 1,3,5-triazine.

17. A resinous product of reaction of ingredients comprising dimethylol urea, 2-guanazo 4,6-diamino 1,3,5-triazine and chloracetamide.

18. The method of preparing new condensation products which comprises effecting reaction between ingredients comprising an aldehyde and a compound corresponding to the general formula

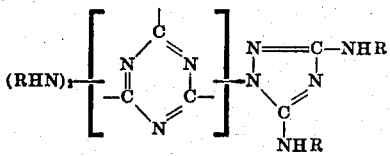

where R represents a member of the class consisting of hydrogen and monovalent hydrocarbon and halo-hydrocarbon radicals.

GAETANO F. D'ALELIO.
JAMES W. UNDERWOOD.